Figure 1:
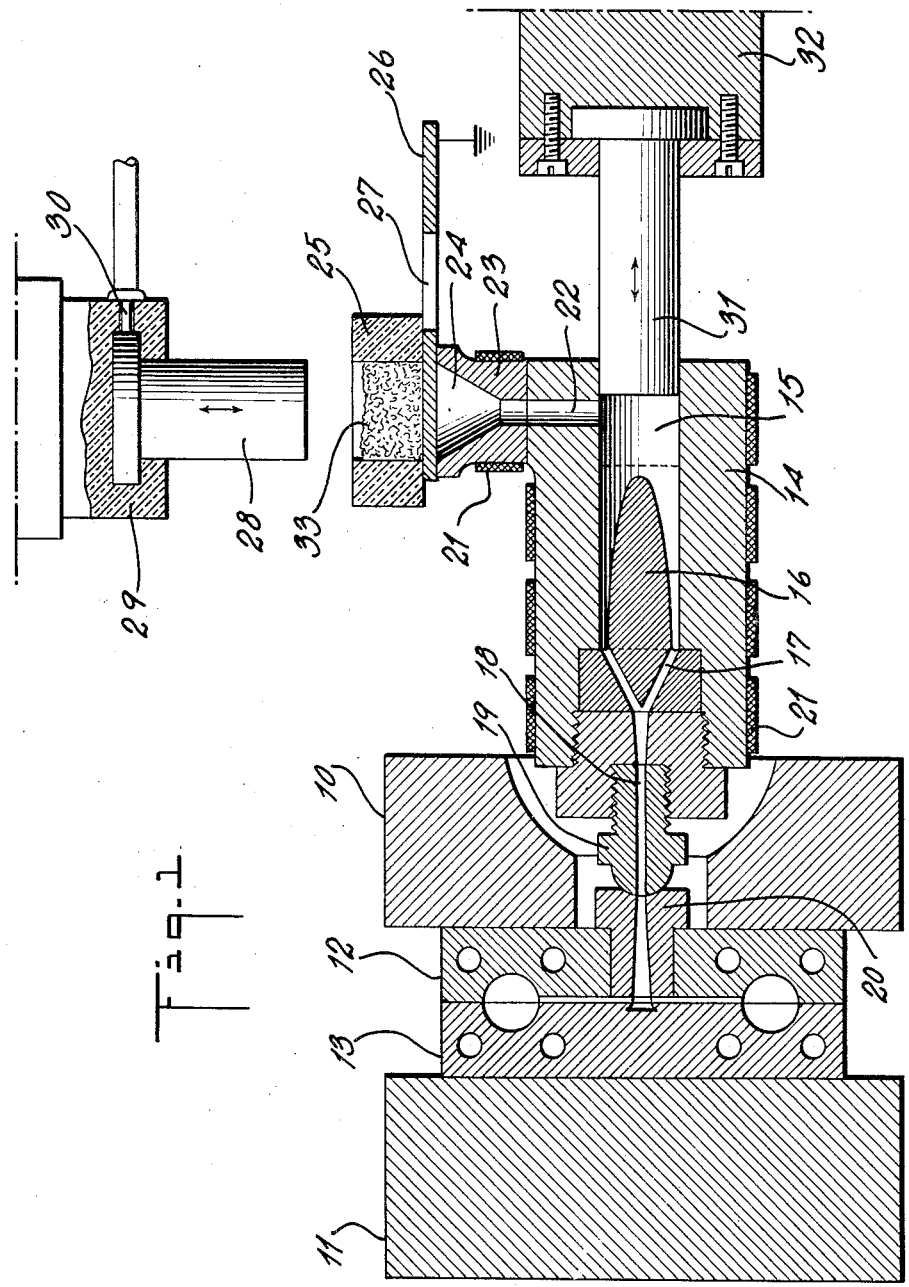

April 20, 1948.  R. W. DINZL  2,439,966
INJECTION MOLDING
Filed June 25, 1943  2 Sheets-Sheet 1

INVENTOR
Richard W. Dinzl
BY
Kenyon & Kenyon
ATTORNEYS

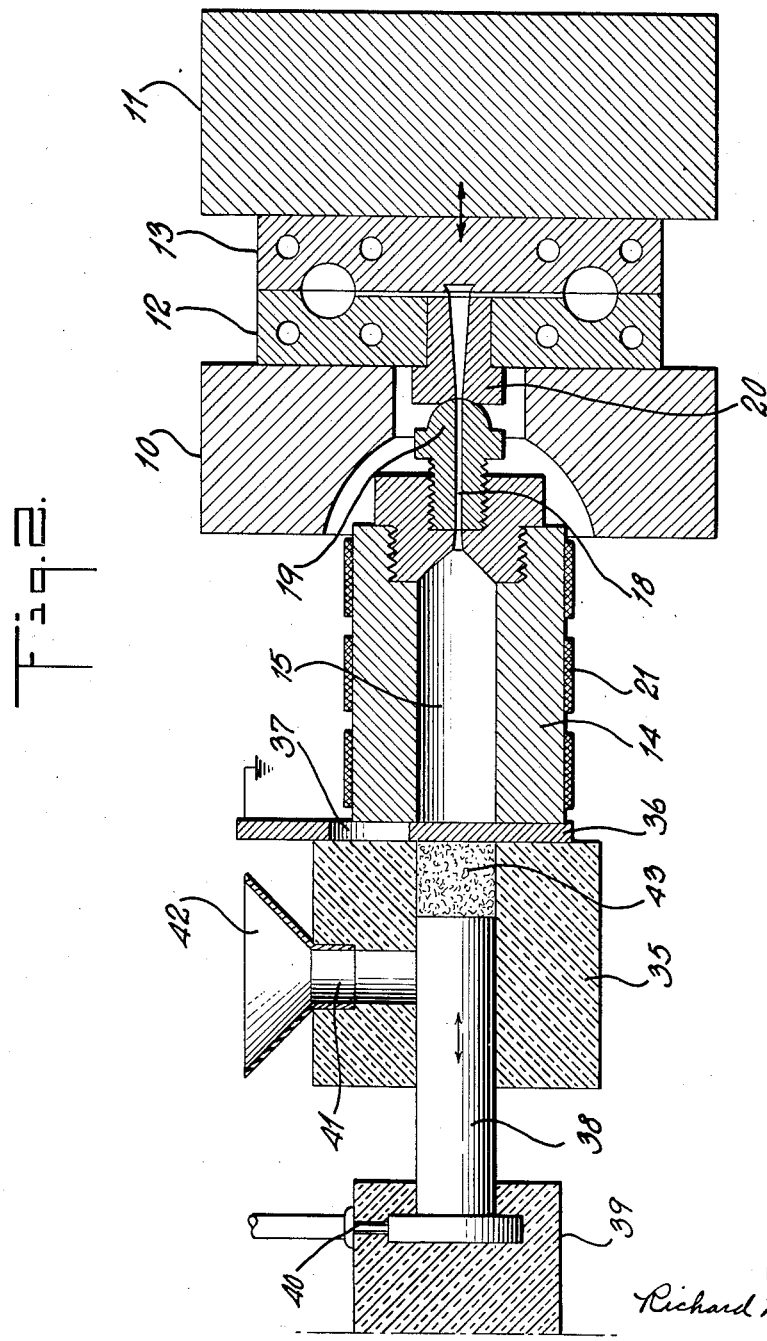

Patented Apr. 20, 1948

2,439,966

UNITED STATES PATENT OFFICE 2,439,966

INJECTION MOLDING

Richard W. Dinzl, Westfield, N. J., assignor to The Watson-Stillman Co., Roselle, N. J., a corporation of New Jersey Application June 25, 1943, Serial No. 492,212

8 Claims. (Cl. 18—30)

1

This invention relates to injection molding.

An object of this invention is the utilization of high frequency alternating voltage to produce heat in a charge of molding material to elevate the material to the temperature at which it becomes plastic.

According to this invention, there is provided a cylinder of insulating material for receiving molding material together with an electrically conductive plunger for applying pressure to molding material in the cylinder. A metal gate is provided for the cylinder and by suitable circuit arrangements high frequency alternating current voltage is impressed between the gate and plunger with the material under sufficient pressure between the gate and plunger to render it conductive to high frequency alternating current. The gate controls passage from the cylinder of molding material to a mold and after the molding material has been plasticized, the gate is opened to permit expulsion of the plasticized molding material from the insulating material cylinder by the plunger. A metal cylinder may be interposed between the insulating material cylinder and the mold and the plasticized molding material may be forced through the metal cylinder into the mold either by the aforementioned plunger or by an additional plunger.

Other objects, novel features and advantages of this invention will become apparent from the following specification and accompanying drawings, wherein:

Fig. 1 is a vertical section through one embodiment of an apparatus for practicing the invention, and Fig. 2 is a similar view of a modification.

In both views, 10 designates the so-called stationary die plate and 11 designates the movable die plate while 12 and 13 designate die sections carried by the die plates 10 and 11 respectively. A metal cylinder has a chamber 15 in which may be arranged a torpedo 16 and from which channels 17 lead to a passageway 18 in a nozzle 19. The nozzle 19 is arranged to co-operate with a bushing 20, the bore of which leads to the die cavity formed by depressions in the die sections 12 and 13. Heating bands 21 surround the cylinder 14. The parts heretofore described are typical of known injection molding apparatus.

Referring now only to Fig. 1, the cylinder 14 is provided with a radial passageway 22 leading to a metal bushing 23 having a flaring mouth 24. A cylinder 25 of insulating material is in alinement with the flaring mouth 24 and a metal gate 26 is slidably arranged between the bushing 23

2 and the cylinder 25 to control communication therebetween. The gate 26 has an opening 27 which in one position of the gate 26 establishes communication between the cylinder 25 and the mouth 24. Reciprocation of this gate is effected by any suitable means, not herein shown.

A metal plunger 28 is mounted for reciprocation into and out of the cylinder 25 and is supported by a slidable head 29 of insulating material. Means, not shown, are provided for effecting reciprocation of the head 29 and a conductor 30 connects the plunger 28 with one terminal of a source of high frequency alternating voltage, the remaining terminal of which is grounded as is also the gate 26.

A plunger 31 is slidably mounted in the chamber 15 and is supported by a head 32. Means, not shown, are provided for effecting reciprocation of the head 32. At one end of its path, the plunger 31 is clear of the passageway 22 and at the other end of its path closes the passageway 22.

In the operation of the apparatus illustrated in Fig. 1, a charge of molding material 33 is introduced into the cylinder 25 with the gate 26 in closed position. The head 29 is then advanced to introduce the plunger 28 into the cylinder 25 to compress the charge 33 between it and the gate 26 to a predetermined extent such that the material 33 becomes conductive to high frequency alternating current. High frequency alternating voltage, preferably of the order of 5,000 volts, is then impressed between the plunger 28 and the gate 26 until the material 33 has become plasticized, after which the high frequency alternating current is interrupted and the gate 26 moved to bring its aperture 27 into position to permit the material 33 to pass into the chamber 15 through the mouth 24 and passageway 21, transfer of the plasticized material being effected by further advancement of the plunger 28. The cylinder 14 is maintained at the plasticized temperature of the molding material by the bands 21 and the plasticized material is forced around the torpedo and through the passages 17 and 18 into the die cavity by the plunger 31 which is advanced for that purpose at the proper time. After the plasticized material is set in the mold, the plungers 31 and 28 are retracted and the gate 26 reset for a second cycle.

Referring now only to Fig. 2, a cylinder 35 of insulating material is arranged in alinement with the cylinder 14. A gate 36 having an opening 37 is arranged between the cylinders 14 and 35 with means, not shown, for effecting reciprocation of it. A metal plunger 38 is mounted in the cylinder 35 for reciprocation and is supported by a head 39 of insulating material. Means, not shown, are provided for reciprocating the head 39 and the plunger 38 is connected by a conductor 40 to one terminal of a source of high frequency alternating voltage (not shown), the remaining terminal of which is grounded as is the gate 36. The insulating cylinder 35 is provided with a passageway 41 leading to the funnel 42 through which a charge of molding material 43 may be introduced into the cylinder with the plunger 38 retracted to open the passageway 41.

In the operation of the modification of Fig. 2, a charge 43 of molding material is introduced into the cylinder 35 through the funnel 42 and passageway 41 with the plunger 38 retracted and the gate 36 in the position shown in this figure. Thereupon, the plunger 38 is advanced to close the passageway 41 and compress the charge 43 between it and the gate 36 sufficiently to render the charge conductive to high frequency alternating current. Then, with the charge under such pressure, high frequency alternating voltage, preferably of the order of 5,000 volts, is impressed between the plunger 38 and the gate 36 to develop heating current in the charge to plasticize it. When the charge has become plasticized the alternating current is interrupted, after which the gate 36 is moved to bring the aperture 37 into position to permit flow of the plasticized material 43 into the chamber 35 and such flow is produced by further advancement of the plunger 38 to cause the molding material to flow around the torpedo 16 and through the passages 18 and 19 into the die cavity. After the molding material has set, the plunger 38 is withdrawn and the gate 36 returned to the position shown in Fig. 2 to condition the apparatus for its next cycle.

I claim:

1. In an injection molding machine, a cylinder of insulating material for receiving molding material, an electrically conductive gate for said cylinder at its discharge end and movable between a position in which the cylinder discharge end is closed and a position in which the cylinder discharge end is open, an electrically conductive plunger operable in said cylinder to apply pressure between it and said gate to molding material in said cylinder, means for impressing high frequency alternating voltage between said plunger and said gate, a mold, and means for conducting plasticized molding material from said cylinder to said mold when said gate is open.

2. In an injection molding machine, a cylinder of insulating material for receiving molding material, an electrically conductive gate for said cylinder at its discharge end and movable between a position in which the cylinder discharge end is closed and a position in which the cylinder discharge end is open, an electrically conductive plunger operable in said cylinder to apply pressure between it and said gate to molding material in said cylinder, means for impressing high frequency alternating voltage between said plunger and said gate, a steel cylinder for receiving plasticized material from said first cylinder, a mold, and means for delivering plasticized molding material from said steel cylinder to said mold.

3. In an injection molding machine, a cylinder of insulating material for receiving molding material, an electrically conductive gate for said cylinder at its discharge end and movable between a position in which the cylinder discharge end is closed and a position in which the cylinder discharge end is open, an electrically conductive plunger operable in said cylinder to apply pressure between it and said gate to molding material in said cylinder, means for impressing high frequency alternating voltage between said plunger and said gate, a steel cylinder for receiving plasticized material from said first cylinder, a mold, and means including said plunger for delivering plasticized molding material from said steel cylinder to said mold.

4. In an injection molding machine, a mold, a steel cylinder communicating with said mold, a reciprocating plunger in said steel cylinder, a second cylinder of insulating material communicating with said steel cylinder through a passageway open in one position of said plunger and closed in another position thereof, an electrically conductive gate for said second cylinder and movable between a position in which said second cylinder is closed and a position in which said second cylinder is open for controlling flow from said second cylinder to said steel cylinder, an electrically conductive plunger operable in said second cylinder to apply pressure between it and said gate to molding material contained in said second cylinder, and means for impressing high frequency alternating voltage between said second plunger and said gate.

5. In an injection molding machine, a cylinder of insulating material for receiving molding material, an electrically conductive gate at one end of said cylinder movable between a position in which the cylinder is closed and a position in which the cylinder is open, an electrically conductive plunger operable in said cylinder to compress said molding material between it and said gate, means for impressing high frequency alternating voltage between said gate and plunger, a metal cylinder communicating with said first cylinder when said gate is open, and a mold communicating with said metal cylinder, said plunger being effective upon opening of said gate to transfer molding material through said metal cylinder into said mold.

6. In an injection molding machine, a mold, a metal cylinder communicating with said mold, a cylinder of insulating material communicating with said metal cylinder and movable between a position in which said two cylinders are in communication and a position in which said two cylinders are out of communication, an electrically conductive gate interposed between said two cylinders, an electrically conductive plunger movable in said insulating material cylinder, and means for impressing high frequency alternating voltage between said plunger and said gate, said plunger being effective upon partial movement to compress material between it and said gate and after opening of said gate to transfer material from said insulating material through said metal cylinder into said mold.

7. In an injection molding machine, a mold, a metal cylinder communicating with said mold, a cylinder of insulating material, a passageway leading from said insulating cylinder through the wall of said metal cylinder radially thereof, a metal gate for said insulating material cylinder movable between a position in which said cylinder is closed and a position in which said cylinder is open for controlling communication between said two cylinders, a metal plunger for compressing between it and said gate molding material in said insulating cylinder, means for impressing high frequency alternating voltage between said plunger and said gate, and a second plunger in said metal cylinder movable across the end of said passageway to transfer molding material from said cylinder to said mold.

8. In apparatus for the injection molding of organic plastic material, the combination with a generator for high frequency current for heating a charge of organic plastic material and an injection cylinder electrically connected to said high frequency generator for receiving said heated charge, of a non-metallic charging cylinder for holding the charge of organic plastic material, a non-conducting plunger for pushing the charge of organic plastic material from said charging cylinder into said injection cylinder, and means on said plunger for applying high frequency electric current to the organic plastic material in said charging cylinder, said means being electrically connected to said high frequency generator.

RICHARD W. DINZL.

REFERENCES CITED

The following references are of record in the file of this patent:

UNITED STATES PATENTS

| Number | Name | Date |
| --- | --- | --- |
| 1,997,263 | Meissner | Apr. 9, 1935 |
| 2,111,857 | Jeffery | Mar. 22, 1938 |
| 2,202,140 | Burroughs | May 28, 1940 |
| 2,304,958 | Rouy | Dec. 15, 1942 |
| 2,325,637 | Stewart | Aug. 3, 1943 |
| 2,341,617 | Hull | Feb. 15, 1944 |
| 2,411,254 | Frank | Nov. 19, 1946 |